United States Patent [19]

Sincerbox

[11] Patent Number: 4,497,534

[45] Date of Patent: Feb. 5, 1985

[54] HOLOGRAPHIC OPTICAL HEAD

[75] Inventor: Glenn T. Sincerbox, San Jose, Calif.

[73] Assignee: International Business Machines Corporation, Armonk, N.Y.

[21] Appl. No.: 470,659

[22] Filed: Feb. 28, 1983

[51] Int. Cl.³ .............................................. G02B 5/32
[52] U.S. Cl. .................................................. 350/3.72
[58] Field of Search ....................... 350/3.6, 3.72, 3.73

[56] References Cited

U.S. PATENT DOCUMENTS

| | | | |
|---|---|---|---|
| 4,253,723 | 3/1981 | Kojima et al. | 350/3.72 |
| 4,312,559 | 1/1982 | Kojima et al. | 350/3.72 |
| 4,458,980 | 7/1984 | Ohki et al. | 350/3.73 |

Primary Examiner—Bruce Y. Arnold
Attorney, Agent, or Firm—Joseph E. Kieninger

[57] ABSTRACT

A holographic optical head for imaging a laser diode for optical storage or magnetic tracking applications includes three holograms, a beam director and a quarter-wave plate. In a preferred embodiment the beam director is a fourth hologram. The holographic optical head is corrected for aberrations arising from its use with light sources other than the design wavelength by having the first hologram diffract the light into the −1 order direction. This light is then diffracted by the second hologram into the +1 order so as to eliminate aberrations normally caused by wavelength shifts of the laser source.

10 Claims, 3 Drawing Figures

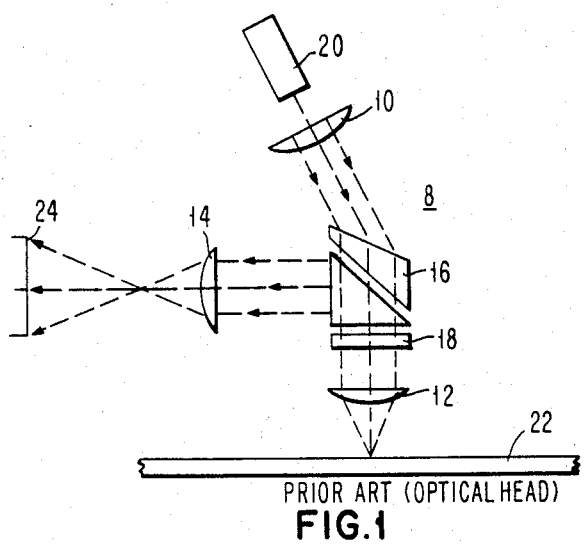
FIG.1 PRIOR ART (OPTICAL HEAD)
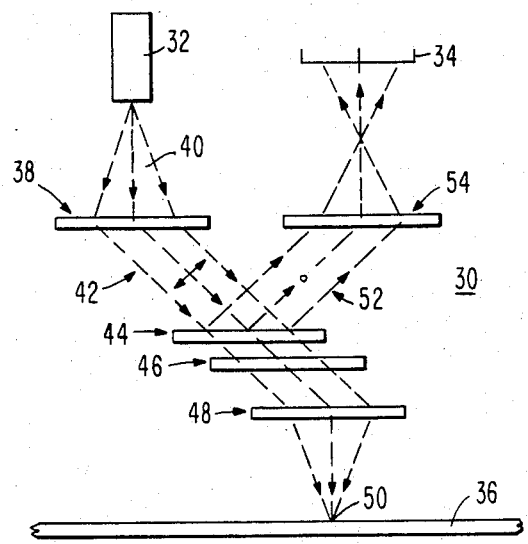
FIG.2
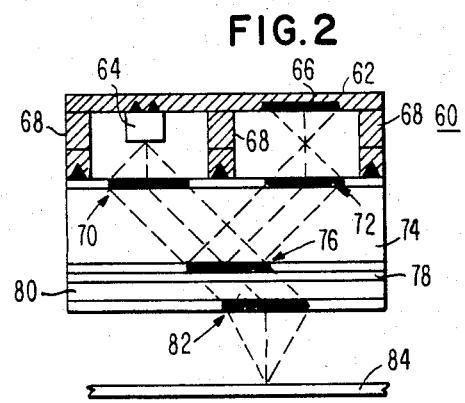
FIG.3

HOLOGRAPHIC OPTICAL HEAD

DESCRIPTION

1. Technical Field

This invention relates to an optical head and more particularly to a holographic optical head.

2. Background Art

The imaging of the light from a laser diode onto the surface of some medium, either for the purpose of optical storage and retrieval of information or for an optical tracking system for magnetic recording, requires the use of a large number of optical elements. A typical system B for optical storage application is shown in FIG. 1. The system comprises three lenses, a collimating lens 10 and objective lens 12 and a servo lens 14. The lenses shown in FIG. 1 are simple single element lenses but in general they will be more complex multielement lenses. A beam splitter and an aspect ratio corrector plate 16 and a quarter-wave plate 18 are required. A coherent beam from the laser diode 20 passes through the system 8 to the recording surface 22 and the information is read by means of detector 24. The elements in the system B are made irregular in shape and must be positioned with high accuracy relative to each other as well as relative to the laser diode 20 and the detector array 24. This type of system has significant mass and size. Currently the control of conventional optic systems such as shown in FIG. 1 is limited by the size and weight of the components. For example, in order to keep the optical head in focus on the surface of a rotating disk, the head must be able to respond to rapid accelerations. The lighter the optical head the more closely the focus may be maintained in the presence of surface fluctuation. In addition, the focus servo technique acts only on the objective lens moving in and out along the "collimated" portion of the wavefront.

An optical reproducing head utilizing an in-line hologram lens, a beam splitter and a quarter-wave plate is described in U.S. Pat. No. 4,312,559 to Kojima et al. U.S. Pat. No. 4,253,723 also to Kojima et al, discloses an optical head which employs input and output holographic lenses. However, the holographic optic heads described in the aforementioned patents must be used with sources at only the design wavelength and do not correct or compensate for image aberrations caused by wavelength shift of the source radiation.

SUMMARY OF THE INVENTION

A holographic optical head for imaging a laser diode for optical storage or magnetic tracking applications includes three holograms, a beam director and a quarter-wave plate. The first hologram collects the light from a diode laser, collimates it and diffracts it into the −1 order direction. The light is p-polarized and passes through the beam splitter and then through the quarter-wave plate onto a second hologram. The second hologram diffracts the light into the +1 order direction and focuses the light so that it converges to a point focus on the desired surface. The use of +1 and −1 orders successively eliminates aberrations normally created by wavelength shifts of the laser source. The light reflected from the surface passes back through the second hologram and becomes S-polarized after passing through the quarter-wave plate. The beam director then directs the returning light at an angle to the original beam so that it strikes a third hologram. The third hologram can either focus the light directly onto a detector or detector array or can divide the beam into multiple points for separate detection of tracking focus and data information. In a preferred embodiment an integrated holographic optic head package includes a common substrate holding a laser diode and a quad detector.

For a further understanding of the invention and of the objects and advantages thereof, reference will be had to the following detailed description and to the accompanying drawings and to the appended claims wherein the specific embodiments of the invention are shown.

BRIEF DESCRIPTION OF THE DRAWINGS

The invention will now be described by way of example and reference to the accompanying drawings in which:

FIG. 1 is a schematic view of a prior art optical head;

FIG. 2 is a schematic view illustrating a holographic optic head in accordance with this invention;

FIG. 3 is a schematic view illustrating an integrated holographic optic head package in accordance with this invention.

DESCRIPTION OF THE PREFERRED EMBODIMENT

As shown in FIG. 2, the holographic optic head is used for imaging a laser diode 32 onto a recording surface 36 which may be a photographic medium, an ablative material such as bismuth or tellurium, etc., or other radiation sensitive materials such as thermoplastic, photoresist, 2-photon (i.e. biacetyl) and magneto optical. The light reflected from the recording surface 36 passes through the optical head 30 to quad detector 34. A first hologram 38 collects the p-polarized light 40 from the diode laser 32. The first hologram 38 collimates the light 40 and diffracts it into the −1 order direction 42. The light passes through the polarization beam director 44 aligned to pass p-polarized light. In a preferred embodiment, the beam, splitter 44 is another hologram. Beam director hologram 44 is fabricated in such a way that it transmits without diffraction p-polarized light incident upon it and will diffract into another beam any s-polarized light incident onto it. For example, by recording a hologram between radiation of wavelength $\lambda$ aligned at $\pm 45°$ to the normal to the hologram surface and selecting a hologram thickness t such that $\Delta n d / \lambda = \sqrt{2}/2$ where $\Delta n$ is the refractive index modulation created in the holpgram. The advantages of using a hologram for beam director 44 are its compact size, planar geometry and common technology to the other key elements. The light then passes through the quarter-wave plate 46 becoming circularly polarized and through hologram 48 which diffracts the light into the +1 order and converges the light to a point focus 50 on the surface of the recording medium 36.

The use of opposing diffraction orders in the diffraction of light from holograms 38 and 48 serve to cancel any image aberrating effect such as chromatic aberration that would be normally caused by either a wavelength shift of the laser source 32 or the finite spectral bandwidth. In this way, such an optical head can be used with lasers of wavelength different from the design wavelength or wavelength shifting caused by laser operation or aging. These are common laser diode problems.

The circularly polarized light reflected back from point focus 50 passes through the second hologram 48 and the quarter-wave plate 46 which converts it to s-polarization and on to the beam splitter 44. The beam splitter then directs the s-polarized returning light at an angle, typically a right angle, to the original beam so that the reflected light 52 passes through the third hologram 54. The third hologram 54 can either focus the light directly onto the quad detector 34 as shown, or can divide the beam into multiple points for separate detection of tracking, focus and data information.

In a preferred embodiment of this invention, integrated holographic optical head package 60 is shown in FIG. 3. The package 60 contains a laser diode 64 and a quad detector 66 positioned on a common substrate 62. The common substrate 62 is spaced from holograms 70 and 72 by spacers 68. The hologram 72 may be a single imaging hologram as shown or it may be a multiple imaging hologram when the detector 66 is an array of discrete detectors (not shown). Holograms 70 and 72 are positioned on glass layer 74 and spaced from beam splitter 76 by the thickness of glass layer 74. Beam splitter 76 is positioned on the quarter-wave plate 78 which in turn is positioned on glass layer 80. The focusing hologram 82 is positioned on glass layer 80 and focuses the light on the recording surface 84. Elements 70, 72, 74, 76, 78, 80 and 82 can be laminated together using optical adhesive to form an integral prealigned unit. The integrated holographic optical head package 60 would be small, light weight and move as one unit during focus servoing. The size could probably be held to a 3×3×5 mm package depending upon the integration of the laser diode and quad detector. The compact package 60 has small size and low weight thereby permitting the optical head to be in focus during rotation and able to respond to rapid accelerations. The lightness of this optical head permits one to more closely maintain the focus for a given vibration of the recording surface.

Although a preferred embodiment of this invention has been described, it is understood that numerous variations may be made in accordance with the principle of this invention.

What is claimed is:

1. A holographic optical head through which a coherent beam of radiation is directed to a record medium and through which a reflected beam of radiation from said record medium is directed to means for sensing the reflected beam comprising:
   first holographic means for diffracting a first coherent beam into the −1 order direction over a first optical path,
   beam director means positioned in said first optical path, said beam director means adapted for directing said first beam along said first path,
   a quarter-wave plate positioned in said first optical path so that said first beam passes therethrough,
   second holographic means positioned in said first optical path diffracting the coherent beam into the +1 order direction for converging said first beam into a point focus on the record medium, and
   third holographic means positioned in a second optical path that is at an angle to said first optical path at said beam director means whereby the light reflected from said record medium passes in reverse direction along said first optical path through said second holographic means and said quarter-wave plate to said beam director means where the light is redirected along said second optical path to said third holographic means and then to the sensing means.

2. A holographic optical head through which a coherent beam of radiation is directed to a record medium and through which a reflected beam of radiation from said record medium is directed to means for sensing the reflected beam comprising:
   first holographic means for diffracting a first coherent beam into the −1 order direction over a first optical path,
   polarization beam director means positioned in said first optical path, said polarization beam director means adapted for directing said first beam along said first path,
   a quarter-wave plate positioned in said first optical path so that said first beam passes therethrough
   second holographic means positioned in said first optical path diffracting the coherent beam into the +1 order direction for converging said first beam into a point focus on the record medium, and
   third holographic means positioned in a second optical path that is at an angle to said first optical path at said beam director means whereby the light reflected from said record medium passes in reverse direction along said first optical path through said second holographic means and said quarter-wave plate to said beam director means where the light is redirected along said second optical path to said third holographic means and then to the sensing means.

3. A holographic optical head as described in claim 2 wherein said polarization beam director means is a fourth holographic means.

4. A holographic optical head as described in claim 2 wherein said quarter-wave plate is a sheet of mica.

5. An integrated holographic optical head system comprising
   a substrate,
   solid state means for providing a coherent beam positioned on said substrate,
   detector means positioned on said substrate in spaced relation to said solid state means,
   first holographic means for diffracting a first coherent beam from said solid state means into the −1 order direction over a first optical path,
   polarization beam director means positioned in said first optical path, said polarization beam director means adapted for directing said first beam along said first path,
   a quarter-wave plate positioned in said first optical path so that said first beam passes therethrough,
   second holographic means positioned in said first optical path diffracting the coherent beam into the +1 order direction for converging said first beam into a point focus on the record medium, and
   third holographic means positioned in a second optical path that is at an angle to said first optical path at said beam director means whereby the light reflected from said record medium passes along said first optical path through said second holographic means and said quarter wave plate to said beam director means where the light is redirected along said second optical path to said third holographic means and then to said detector means.

6. An integrated holographic optical head system as described in claim 5 wherein said solid state means is a gas laser.

7. An integrated holographic optical head system as described in claim 5 wherein said solid state means is a laser diode.

8. An integrated holographic optical head system as described in claim 5 wherein said detector means is a quadrant detector.

9. An integrated holographic optical head system as described in claim 5 including a layer of glass positioned between said first holographic means and said beam director.

10. An integrated holographic optical head system as described in claim 5 including a layer of glass positioned between said quarter-wave plate and said second holographic means.

* * * * *